United States Patent

[11] 3,578,934

| [72] | Inventor | Rene G. Beauvais |
| --- | --- | --- |
| | | 1614-3rd St., Bay City, Mich. 48706 |
| [21] | Appl. No. | 825,468 |
| [22] | Filed | Feb. 24, 1969 |
| | | Division of Ser. No. 582,042, Sept. 26, 1966. |
| [45] | Patented | May 18, 1971 |

[54] WIRE CONDENSER MAT WELDER AND METHOD OF FORMING
17 Claims, 7 Drawing Figs.

[52] U.S. Cl. .................................................. 219/56, 114/112, 219/57
[51] Int. Cl. ................................................... B23k 11/00, B63h 9/04
[50] Field of Search ............................................ 219/56, 57, 58; 114/112

[56] References Cited
UNITED STATES PATENTS

| 2,390,174 | 12/1945 | Roemer | 140/112X |
| 2,747,064 | 5/1956 | Van Pappelendam | 219/117 |
| 3,288,976 | 11/1966 | Sandret | 219/80X |
| 3,369,575 | 2/1968 | Rosler | 140/112 |

OTHER REFERENCES

Appliance Manufacturer, " How Westinghouse Welds Condensers", March 1965, pages 67 & 68

*Primary Examiner*—J. V. Truhe
*Assistant Examiner*—Hugh D. Jaeger
*Attorney*—Learman, Learman & McMulloch

ABSTRACT: Apparatus for manufacturing wire condenser mats wherein at least one rigidifying wire is spot welded to a series of crosswisely extending connected loops to rigidify the mat structure and insure proper spacing of the loops. The rigidified structure is then passed to a second welding station where a wire field is welded to the loops to complete the condenser mats.

Patented May 18, 1971
3,578,934
2 Sheets-Sheet 1
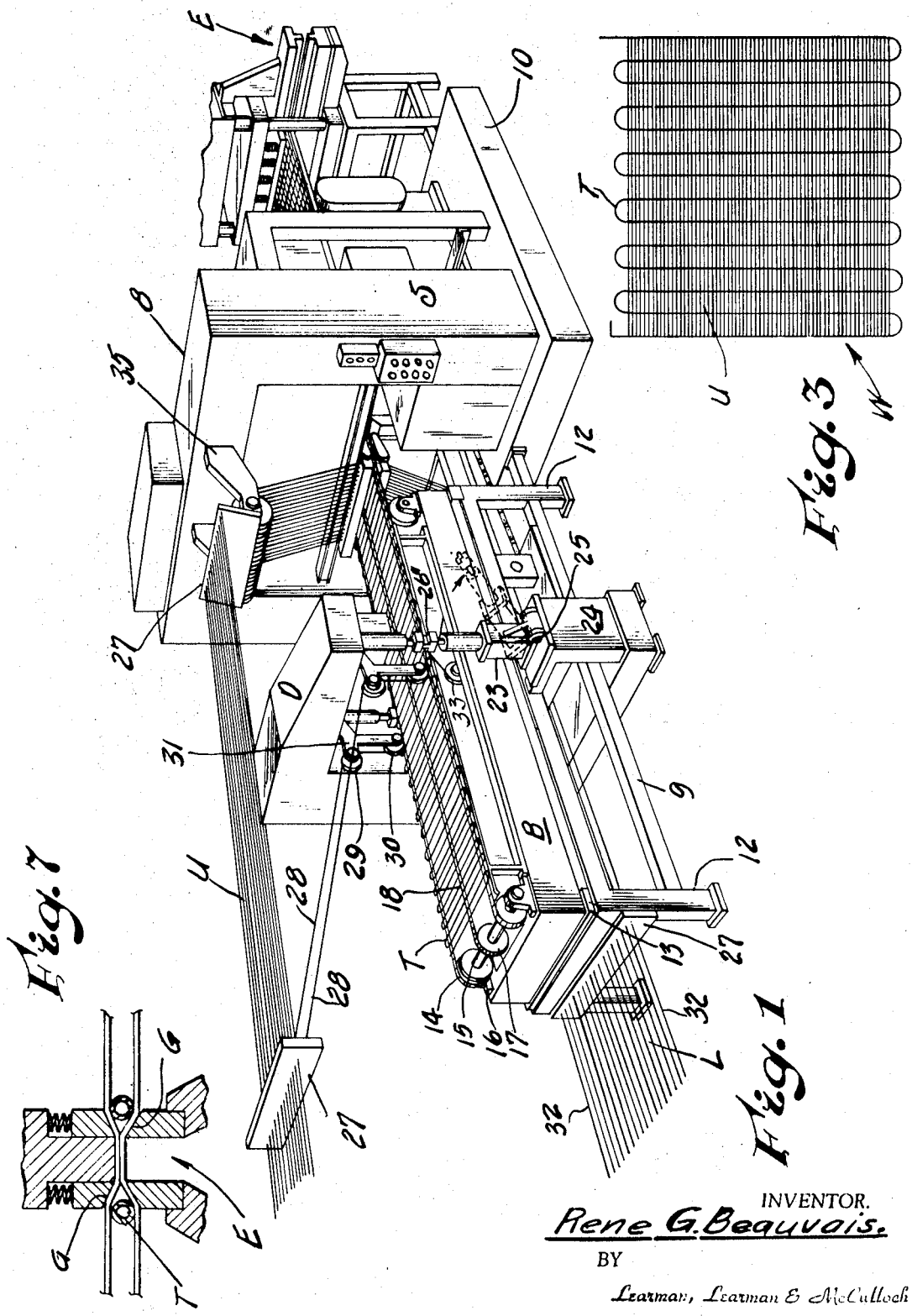
INVENTOR.
Rene G. Beauvais.
BY
Learman, Learman & McCulloch
ATTORNEYS

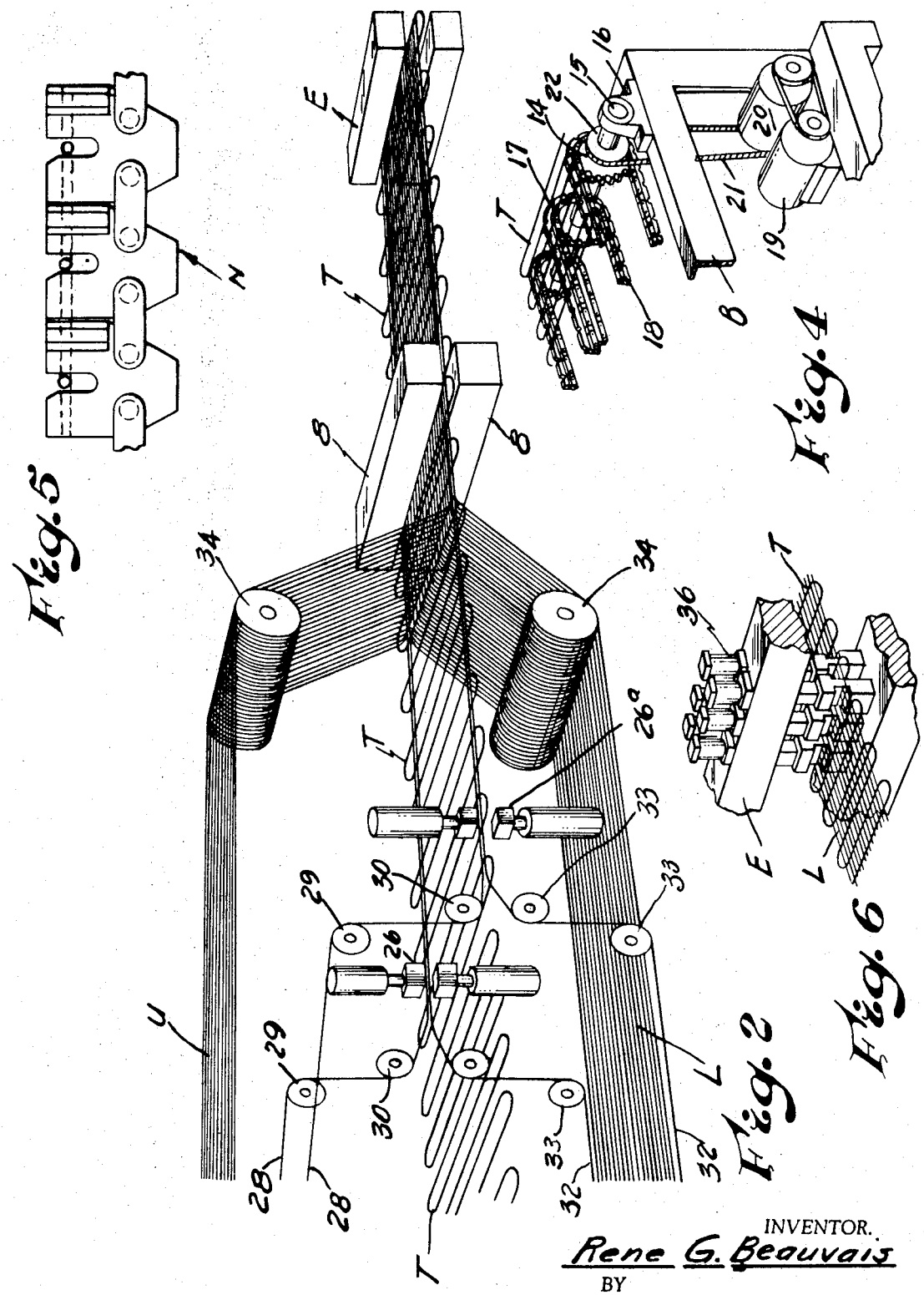

WIRE CONDENSER MAT WELDER AND METHOD OF FORMING

This is a division of application Ser. No. 582,042, filed Sept. 26, 1966.

This invention relates to wire condenser mat welders, and more specifically to a mat welder having quick changeover features, allowing the manufacture of a plurality of tube pitch spacings, previously too expensive and time consuming on machines presently in use due to the large number of changeover operations necessary to accommodate each pitch pattern.

Wire condensers of the type herein referred to consist of a serpentine formed tube formed with multiple passes of from four to 30 folds per mat, said mats running in a continuous, uninterrupted pattern through the machine. A series of spaced apart fields of longitudinal wires cross the longitudinal passes of the tubes and are welded to the opposite sides of the tubes, with the number of wires running from approximately 30 to 150 wires on each side of the tube pattern. After the welding and indexing operations of the machine, a wire cutoff unit shears the longitudinal wires at the ends of the interrupted tube passes, making a plurality of individual mats from the continuous line.

It should be understood that this matter of assembling mats by using continuous wire feed and serpentine passes through a mechanical press welder and shear has heretofore been used in the industry. However, these machines of previous design had a serious disadvantage, which was the limitation of running one tube pitch pattern only through the machine. Each time it was necessary to run another tube pitch pattern, an expensive time-consuming changeover was necessary.

In brief, the prime object of the invention is to provide a changeover process utilizing an interchangeable cartridge-type chain feeder for the serpentine tubes which accomplishes the spacing and indexing of the tube through a spot welder which guides and welds the two extreme side wires of the wire field to the top and bottom sides of the serpentine tube, thus anchoring the wires to the tubes with the wires acting as spacers for the subsequent feeding of the parts through the weld press and to the cutoff shear.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion and minor details of construction, without departing from the spirit, or sacrificing any of the advantages of the invention.

In the drawings:

FIG. 1 is an isometric, side elevational view of my wire condenser mat welder, the broken lines showing one leg of the welder frame swung down;

FIG. 2 is a diagrammatic representation of the welding and feeding sequence;

FIG. 3 is a plan view of one of the mats;

FIG. 4 is a fragmentary, isometric view of the conveyor drive;

FIG. 5 is a fragmentary, perspective view of a section of the conveyor chain;

FIG. 6 is a fragmentary, perspective view of the press welder; and

FIG. 7 is a transverse sectional view showing the shearing mechanism.

Referring now more specifically to the drawings in which I have shown the preferred embodiment of my invention. The numeral 8 indicates a main mechanical press welder which is of conventional design, and a frame section 9 is secured to the base 10 of the press welder by welding or by means of bolts or the like, and legs 12 are provided on said frame as usual. An interchangeable cartridge-type chain feeder table B is mounted on the frame 9, and transversely disposed pad members 13 span the ends of the frame and form a support for the chain feeder unit.

Sprockets 14 are mounted on shafts 15 journaled in bearings 16 provided on the ends of the table B, and other sprockets 17 are interposed between the side sprockets 14 to accommodate other tubes which are shorter in length.

A drive chains 18 drivingly connects the sprockets 17 and the driving means comprises a motor 19, clutch and drive system 20, and a drive chain 21 connects the motor with a drive sprocket 22 provided on the conveyor shaft 15.

A small frame-type spot welder D spans the chain feeder table B, and one leg section 23 of said frame is hingedly mounted on a leg support 24 by means of a hinge bolt 25, and for a purpose to be presently described.

A wire condenser mat unit W is clearly shown in FIG. 3 of the drawings and consists of a serpentine formed tube T with multiple passes of from four to 30 folds per mat; the mats being fed on the machine by an operator, and these mats travel in a continuous uninterrupted pattern through the machine.

A pair of preweld stations 26—26 are provided on the welder frame D and are arranged for welding the two extreme side wires of both the upper and lower fields U and L as they travel over the feeder table B, and the upper and lower fields of longitudinal wires U and L cross the longitudinal tubes T and are welded to the opposite sides thereof, the number of wires running from approximately 30 to 150 wires on each side of the tube, and these tubes are in fact supported by the weld of the single wires to the tube T so that when welded they accurately bridge the space between the end of the feeder table and the main press welder 8 as they travel to the press welding station and thence to the cutoff shear E which include blades G which do the cutting, and I shall not describe this weld station and the cutoff shears in detail as they are the same as used on previously manufactures machines and form no part of the present invention.

The features of the instant invention are schematically shown in FIGS. 1 and 2 of the drawings, the upper wire field U leading from a balcony (not shown), or from a customer's existing wire field through perforated stationary bushing guide members 27, at which point the two opposite outer edge wires 28—28 of the upper wire field lead over grooved rollers 29 and 30, which are journaled on a triangularly shaped bracket 31 which is adjustably mounted on the welder frame D, thence leading to one of the preweld stations 26 for welding the wires to the opposite sides of the tubes. The outer edge wires 32—32 of the lower field L are substantially the same as the upper field, these wires also lead through bushing guide members 27, mounted on the end of the table B, thence inwardly below the table B, thence upwardly over the grooved rollers 33—33, which are mounted on the frame 12, thence leading to one preweld station 26 which welds these wires to the tubes. This welding of the edge wires anchors the tubes, and the wires serve as spacers. The preweld stations 26—26 are exactly the same, and as these edge wires are welded to the tubes T they travel over the end of the table and feed into the main press welder S. Simultaneously therewith, the remaining wires of each field feed through the bushing guides 27, thence over the grooved rollers 34—34, which are mounted on brackets 35 provided on the frame. Thence these wires are conveyed over the feeder table B and into a welding station the main press welder S, see FIG. 6 of the drawings, which shows the weld heads E of the press welder in contact with the incoming wire, and the serpentine tubes T. After the condenser travels through the press welder, a wire cutoff unit E (see FIG. 7 of the drawings) shears the individual wires at the end of the interrupted tube passes, making individual mats W from the continuous line.

In prior machines of this general classification the biggest drawback is the changeover process and the limitation of running only one-two pitch pattern through the machine. This pitch pattern is the distance between multiple passes formed by the serpentine formed tubes, and when it becomes necessary to change to another pitch pattern, another very extensive time-consuming changeover of the feeder table, etc., is necessary, and I have, therefore, designed the cartridge-type chain feeder table B equipped with chains N which accommodate the serpentine tube T and accomplishes the spacing and indexing of the tube pitches through the small frame-type spot welders 26, which welds the single side wires of each field to the opposite sides of the serpentine tube, and it will be obvious that this prewelding of the side wires to the tube insures accurate horizontal travel and rigidity of the wire as it travels to the welder, and this anchors the tubes, with the wires serving as spacers for subsequent feeding of the wire into the main press welder. The remaining wires are then fed directly to the feeder table and into the press welder, and the chain feeder system terminates at a point spaced from the press welder station. This welding of the side wires to the tubes eliminates the need for an index feeder chain (not shown) to pass through the press weld station.

In accomplishing this changeover, the operator first swings down the outboard lower spot welding gun 26a on the frame spot welder, after which he removes the cartridge feeder table B and replaces it with another tooled for a different pitch spacing, and this is done either by means of an inbuilt hoist (not shown), which forms a part of the machine, or by means of a hoist located at a point directly adjacent the machine. The outboard gun 26a is then swung back to adjusted position, and the extreme side wires are fed back through the weld unit ready for welding through the first tube pass that enters the machine.

This changeover consumes only a very limited down time and expense, and the machine is readily set to produce a certain tube pitch pattern. The mat shown is the continuous pattern which travels through the press welder, thence travels to the shear station from which the mats (shown in FIG. 3) are then cut to predetermined length and ejected.

While preferred embodiments in accordance with the present invention have been illustrated and described, it should be understood that various modifications may be resorted to without departing from the spirit and scope of the appended claims.

I claim:

1. Apparatus for manufacturing wire condenser mats with a series of crosswisely extending connected loops disposed in front to rear relation to form a mat length comprising:
   a. first and second welding stations;
   b. means for presenting said mat length to said first welding station;
   c. means for simultaneously running a plurality of lengthwisely extending parallel wires a spaced distance above said mat length, forward and beyond said first welding station; and a similar plurality of lengthwisely extending parallel wires disposed a spaced distance below said mat lengths, forward and beyond said first welding station;
   d. means for peeling off the edge wire at each side of the plurality of upper wires, and each side of the lower wires and bringing them into juxtaposed position with the mat lengths downstream of the first welding station;
   e. means for moving the mat lengths through the first and second welding stations with said edge wires;
   f. said first welding station including means for spot welding the edge wires to the loops as they pass through the first welding station;
   g. means for moving the remaining upper wires and the remaining lower wires into juxtaposed position with the mat lengths downstream of said first welding station and upstream of said second welding station; and
   h. said second welding station including means for welding the said remaining wires to the loops as they are passed therethrough.

2. Apparatus for manufacturing a wire condenser mat comprising;
   welding means providing a welding station for welding a longitudinally extending wire field to a series of crosswisely extending connected loops to form a condenser mat;
   means for supporting said wire field at said welding station;
   longitudinally disposed conveying means extending toward one side of said welding station, but terminating adjacent said one side of said welding station, for conveying said crosswisely extending connected loops to said welding station to be welded by said welding means and then conveying the mat thus formed to the other side of said welding means; and
   prewelding means mounted adjacent said conveyor means, upstream of said welding means, for welding at least one lengthwise extending wire across said loops to rigidify the mat; said conveying means being adapted to convey the prewelded mat to said welding means.

3. Apparatus as set forth in claim 2 wherein said prewelding means spans said conveying means and includes portions extending on laterally opposite sides of said conveying means in a manner limiting any relative laterally movement of said prewelding means and said conveying means; one of said portions being swingably movable from a position alongside said conveying means to a removed position to provide space to permit relative lateral movement between said prewelding means and said conveying means.

4. Apparatus as set forth in claim 2 wherein said prewelding means includes means for welding said one wire adjacent one edge of said mat; and said welding means for welding said wire field comprises means for welding a series of longitudinally extending wires to said crosswisely extended loops.

5. Apparatus for manufacturing a wire condenser mat as set forth in claim 4 wherein said prewelding means further includes means for welding one of said lengthwise extending wires adjacent the opposite edge of said mat, and said welding means for welding said wire field includes means for welding said series of longitudinally extending wires between the edge wires.

6. Apparatus for manufacturing a wire condenser as set forth in claim 4 wherein said prewelding means includes means for welding one of said lengthwise extending wires along both sides of said mat along both edges thereof; and said welding means for welding said wire field includes means for welding a series of longitudinally extending wires on both sides of said mat.

7. Apparatus as set forth in claim 4 wherein said prewelding means includes laterally spaced pairs of opposed electrodes mounted on laterally opposite sides of said conveying means; said welding means including a pair of opposed electrodes having portions supported to span at least a portion of the distance between the laterally spaced pairs of electrodes at said prewelding means.

8. Apparatus for manufacturing a wire condenser mat with a longitudinally extending sinuous tubular member comprising;
   means for providing a lengthwisely extending wire adjacent each lateral edge of said sinuous tubular member;
   welding means providing a welding station for welding said lengthwisely extending wires to said lateral edges;
   removably mounted conveying means for conveying said sinuous tubular member through said welding station to be welded by said welding means;
   said welding means comprising portions extending on laterally opposite sides of said conveying means limiting any relative lateral movement between said welding means and said conveying means; one of said portions being swingably movable from a position alongside said conveying means to a removed position to provide space to permit relative lateral movement between said conveying means and said welding means.

9. Apparatus as set forth in claim 8, wherein said welding means transversely spans said conveying means.

10. Apparatus for manufacturing a wire condenser with a series of longitudinally disposed, crosswisely extending, connected loops forming a mat length comprising;
   conveying means for conveying said mat length in a longitudinal path;
   first welding means, adjacent said conveying means, for welding one lengthwisely extending wire adjacent each lateral edge of said mat length across at least one side of each of said crosswisely extending loops to connect said loops and rigidify the mat length;

means, in juxtaposition with said conveying means, for passing a wire field, including a series of longitudinally extending wires, adjacent said loops and between the edge wires; and second welding means, adjacent said conveying means and downstream of said first welding means, for welding said series of longitudinally extending wires to said loops;

said conveying means being adapted to convey the mat length welded by said first welding means to said second welding means.

11. Apparatus for manufacturing a wire condenser mat with a series of longitudinally disposed crosswisely extending connected loops forming a mat length comprising;

conveying means for conveying said mat length in a longitudinally extending path;

first welding means adjacent said conveying means for welding at least one lengthwisely extending wire across each side of opposite sides of said loops to connect said loops and rigidify the mat length;

means in juxtaposition with said conveying means for moving a wire field adjacent the loops crosswise thereto; and second welding means adjacent said conveying means downstream of said first welding means for welding the wire field to said loops;

said conveying means being adapted to convey the mat length welded by said first welding means to said second welding means.

12. Apparatus for manufacturing a wire condenser mat with a series of longitudinally disposed, crosswisely extending, connected loops forming a mat length comprising:

conveying means for conveying said mat length in a longitudinally extending path of travel;

first welding means adjacent said conveying means for welding at least one lengthwisely extending wire across said loops to connect said loops and rigidify the mat length;

means for passing a longitudinally extending wire field adjacent each side of opposite sides of the loops; and second welding means adjacent said conveying means and downstream of said first conveying means for welding said wire field to said loops;

said conveying means being adapted to convey the mat length welded by said first welding means to said second welding means.

13. Apparatus for manufacturing a wire condenser mat with a series of longitudinally disposed, crosswisely extending, connected loops forming a mat length comprising:

conveying means for conveying said mat length in a longitudinally extending path;

first welding means adjacent said conveying means for welding at least one lengthwise wire adjacent one edge of the mat length so as to contact said loops on only one side of each of said loops;

means in juxtaposition with said conveying means for passing a wire field including a series of longitudinally extending wires adjacent the loops laterally inwardly of said edge wire; and second welding means adjacent said conveying means and downstream of said first welding means for welding the wire field to said loops;

said conveying means being adapted to convey the mat length welded by said first welding means to said second welding means.

14. Apparatus for manufacturing a wire condenser mat with a series of longitudinally disposed, crosswisely extending connected loops comprising:

a conveyor for conveying said connected loops in a longitudinal path;

a first welding station adjacent said conveyor and including laterally spaced apart pairs of welding electrodes mounted at the laterally opposite sides of said conveyor, the electrodes of each pair being mounted in opposed relation;

a second welding station adjacent said conveyor downstream of said first welding station and including a pair of opposed welding electrodes supported to span at least a portion of the distance between the laterally spaced apart pairs of electrodes of said first welding station;

wire supporting members in juxtaposition with said conveyor for supporting a plurality of parallel, longitudinally extending wires in juxtaposition with said conveyor;

a first set of wire guide members for guiding lateral edge wires of said plurality of wires between the opposed electrodes of said laterally spaced apart pairs of electrodes; and a second set of wire guide members for guiding the remaining longitudinally extending wires between said pair of welding electrodes at said second welding station;

said conveyor extending through said first welding station but terminating adjacent one side of the pair of electrodes at said second welding station for conveying the connected loops welded at said first welding station to said second welding station.

15. Apparatus as set forth in claim 14 wherein the opposed electrodes of each pair of welding electrodes at said first welding station are movable toward and away from each other between inoperative and welding positions; means for moving the opposed welding electrodes at said first welding station between said inoperative and welding positions; said opposed welding electrodes of said second welding station being movable toward and away from each other between inoperative and welding positions; and means for moving the opposed electrodes at said second welding station between said inoperative and said welding positions.

16. Apparatus as set forth in claim 14 wherein said pairs of laterally spaced electrodes at said first welding station extend alongside laterally opposite sides of said conveyor to restrict any lateral movement of said conveyor; one of said electrodes on one side of said conveyor being mounted for swinging movement from a position alongside the conveyor to a removed position to permit relative lateral movement between said conveyor and the electrodes at said first welding station.

17. Apparatus as set forth in claim 14 wherein said first set of wire guide members is positioned upstream of said welding electrodes at said first welding station and said second set of wire guide members is positioned downstream of said first welding station but upstream of said second welding station.